United States Patent
Harris et al.

(10) Patent No.: US 9,020,659 B2
(45) Date of Patent: Apr. 28, 2015

(54) DYNAMOMETER VEHICLE OPERATING MODE CONTROL

(71) Applicant: Ford Global Technologies, LLC, Dearborn, MI (US)

(72) Inventors: John W. Harris, Plymouth, MI (US); Mark D. Malone, Canton, MI (US); Marian S. Chupa, Dearborn, MI (US); Chad E. Griffin, Pinckney, OH (US); William N. Mansur, West Bloomfield, MI (US); Mark R. Laleman, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 13/904,293

(22) Filed: May 29, 2013

(65) Prior Publication Data
US 2013/0338849 A1    Dec. 19, 2013

Related U.S. Application Data

(60) Provisional application No. 61/660,667, filed on Jun. 15, 20

(51) Int. Cl.
*G06F 17/00* (2006.01)
*B60W 10/04* (2006.01)
(Continued)

(52) U.S. Cl.
CPC .............. *G06F 17/00* (2013.01); *B60W 10/04* (2013.01); *B60W 10/06* (2013.01); *G01M 17/0074* (2013.01)

(58) Field of Classification Search
CPC ............. B60R 2021/0004; B60R 2021/0006; B60R 2021/0018; B60R 21/0134; B60R 21/01; B60W 10/22; B60W 10/04; B60W 10/06; B60W 10/18; B60W 10/184; B60W 10/20; B60W 2030/041; B60W 2030/043; B60W 2420/52; F02N 11/0822; F02N 2200/103; F02N 11/0814; F02N 11/0833; F02N 11/0844; F02N 2200/022; F16H 59/44; F16H 2059/443; F16H 59/22; F16H 59/54; G01S 13/931; G01S 17/936; G01S 2013/9332; G01S 2013/936; G01S 2013/9378; G01S 2013/9385; G01S 7/023; G01S 2013/9317; G01S 2013/9339; G01S 2013/9342; G01S 2013/9346; G01S 2013/935; G01S 2013/9353; G01S 2013/9357; G01S 2013/9364; G01S 2013/9375; Y02T 10/48; Y02T 10/18; Y02T 10/42; A01D 2101/00; A01D 34/64; A01D 34/661; B60B 33/00; B60C 23/0408; B60G 11/16; B60G 11/54; B60G 17/0195; B60G 2200/10; B60G 2200/144; B60G 2204/124; B60G 2204/143; B60G 2204/148; B60G 2204/4232; B60G 2204/43; B60G 2206/50; B60J 3/0213; B60N 2/0252; B60Q 1/0683; B60Q 1/076; B60T 2201/10; B62D 5/0472; B62D 5/062; B64D 45/00; F01L 13/06; F01L 9/02; F02B 1/04; F02D 13/0215; F02D 13/0253; F02D 13/0261; F02D 2200/502; F02D 41/0002; F02D 41/009; F02D 41/042; F02D 41/2403; F16F 3/12; F16F 55/041; G01C 21/3647; G01M 15/102; G01M 17/0072; G09B 29/106; Y10T 29/49826; F16L 55/041

USPC ......... 701/1, 35, 36, 41, 45, 49, 51, 112, 113; 123/90.13; 73/23.31, 116.06; 56/15.8; 264/328.8; 362/512; 296/97.11; 345/589

See application file for complete search history.

(56) References Cited

U.S. PATENT DOCUMENTS 4,009,695 A * 3/1977 Ule .............................. 123/90.13
5,036,700 A * 8/1991 Knestel ....................... 73/116.06

(Continued)

*Primary Examiner* — James Trammell
*Assistant Examiner* — Sanjeev Malhotra
(74) *Attorney, Agent, or Firm* — James Dottavio; MacMillan, Sobanski & Todd, LLC

(57) ABSTRACT

A vehicle and a method of controlling a dynamometer mode operation of a vehicle that includes requesting the dynamometer mode; monitoring for at least one non-dynamometer vehicle operating condition; if at least one of the non-dynamometer vehicle operating conditions is detected, prohibiting dynamometer mode; and if none of the non-dynamometer vehicle operating conditions is detected, operating the vehicle in dynamometer mode.

18 Claims, 4 Drawing Sheets

(51) Int. Cl.
    *B60W 10/06*     (2006.01)
    *G01M 17/007*     (2006.01)

(56)     References Cited

U.S. PATENT DOCUMENTS

| | | | |
|---|---|---|---|
| 5,101,660 A | 4/1992 | La Belle | |
| 6,157,878 A | 12/2000 | Suzuki | |
| 6,457,351 B1 | 10/2002 | Yamamoto | |
| 6,606,898 B1* | 8/2003 | Abe et al. | 73/23.31 |
| 7,811,089 B2 | 10/2010 | Bond | |
| 8,001,835 B2 | 8/2011 | Engstrom | |
| 8,145,388 B2* | 3/2012 | Kusunoki | 701/49 |
| 2002/0198630 A1* | 12/2002 | Klein et al. | 701/1 |
| 2003/0193115 A1* | 10/2003 | Bhattacharyya et al. | 264/328.8 |
| 2005/0027417 A1* | 2/2005 | Sawada et al. | 701/41 |
| 2005/0278098 A1* | 12/2005 | Breed | 701/45 |
| 2007/0127254 A1* | 6/2007 | Chen | 362/512 |
| 2007/0180805 A1* | 8/2007 | Melone et al. | 56/15.8 |
| 2007/0219695 A1* | 9/2007 | Chiu et al. | 701/51 |
| 2008/0040004 A1* | 2/2008 | Breed | 701/45 |
| 2008/0059021 A1* | 3/2008 | Lu et al. | 701/36 |
| 2009/0079224 A1* | 3/2009 | Osborne et al. | 296/97.11 |
| 2009/0138184 A1* | 5/2009 | Terada | 701/112 |
| 2011/0130919 A1* | 6/2011 | Neuscheler et al. | 701/35 |
| 2012/0029796 A1* | 2/2012 | Chen | 701/113 |
| 2013/0162665 A1* | 6/2013 | Lynch | 345/589 |

\* cited by examiner

US 9,020,659 B2

DYNAMOMETER VEHICLE OPERATING MODE CONTROL

CROSS-REFERENCE TO RELATED APPLICATIONS

This application claims the benefit of U.S. provisional patent application 61/660,667, filed Jun. 15, 2012, which is incorporated herein by reference.

BACKGROUND OF INVENTION

The present invention relates to a method of vehicle operation and more particularly to vehicle operating strategies for use with chassis dynamometer testing.

During vehicle development, vehicles may be tested on chassis dynamometers, where the powered wheels are mounted on some type of roller system to allow the vehicle operations to be tested while the vehicle is stationary. Today's modern vehicles have many different computer controlled systems that, under normal operating conditions (normal mode), monitor and automatically change vehicle operation based on the monitored vehicle systems. There may be difficulty testing vehicles on a single roll chassis dynamometer when the vehicle controllers are set to operate under normal operating conditions because of the operation of anti-lock brake and other systems which will set malfunction indications when all four wheels are not turning. For hybrid vehicles in particular, such operation faults may inhibit proper testing of vehicle functions such as stop-start, regenerative brakes and other hybrid vehicle functions making the dynamometer test results non-representative of the emission and fuel economy of the vehicle under normal use on the road.

Accordingly, while operating a vehicle on a chassis dynamometer, vehicle operation algorithms may be employed to control the vehicle that are not active when the vehicle is operating under normal driving conditions. These dynamometer operation algorithms (dynamometer mode operation) enable the particular testing to be accomplished on the dynamometer. The dynamometer operation algorithms may also require additional component redundancy or complex algorithms to determine when to start and when to exit execution of the dynamometer control mode algorithms, which may support safe operation of the vehicle on the dynamometer and also assure the dynamometer mode is not activated when the vehicle is not on a dynamometer.

SUMMARY OF INVENTION

An embodiment contemplates a method of controlling a dynamometer mode operation of a vehicle comprising: requesting the dynamometer mode; monitoring for at least one non-dynamometer vehicle operating condition; if at least one of the non-dynamometer vehicle operating conditions is detected, prohibiting dynamometer mode; and if none of the non-dynamometer vehicle operating conditions is detected, operating the vehicle in dynamometer mode.

An embodiment contemplates a vehicle having a dynamometer operation algorithm to operate in a dynamometer mode comprising: a sensing system configured to detect a non-dynamometer vehicle operating condition; and a controller configured to monitor the sensing system for the non-dynamometer vehicle operating condition while the vehicle is operating in the dynamometer mode and automatically switching out of the dynamometer mode when at least one of the non-dynamometer vehicle operating conditions is detected.

An advantage of an embodiment is that simple detection of non-dynamometer vehicle operation is detected to assure that dynamometer operation algorithms are used while undergoing dynamometer tests, but are not employed when the vehicle is not undergoing dynamometer testing.

An additional advantage of an embodiment is that the dynamometer operation monitoring makes use of information that is already readily available on the vehicle, that is the sensors and related signal feedback that already exists for use under normal vehicle operating conditions (i.e., real world vehicle operation).

DETAILED DESCRIPTION

Figure 1:
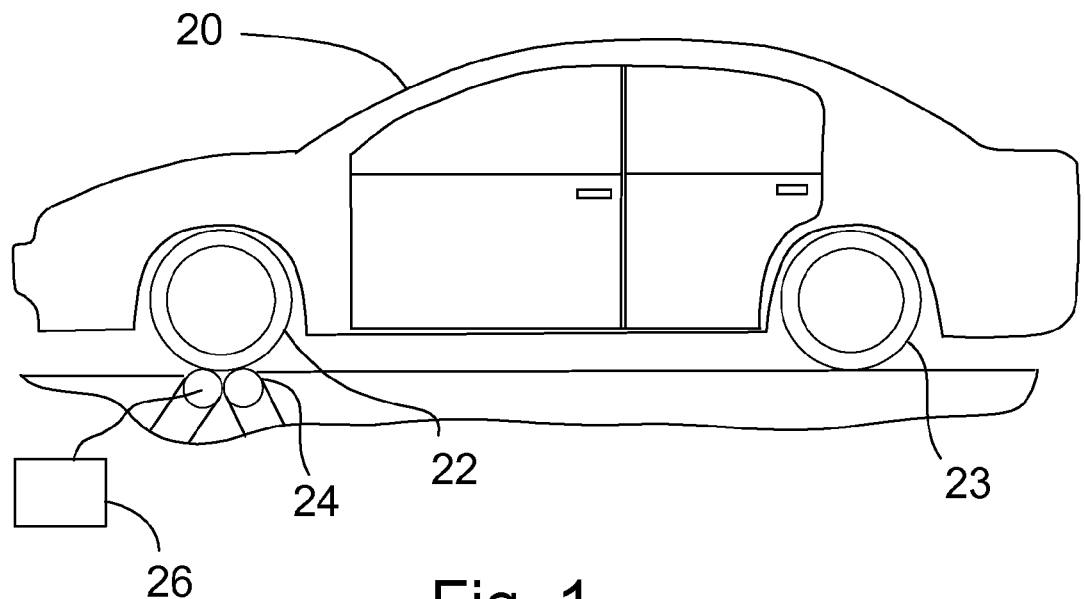
FIG. 1 is a schematic view of a front wheel drive vehicle mounted in a chassis dynamometer.

FIG. 1 shows a front wheel drive vehicle 20 with the front wheels 22 mounted on rollers 24 of a chassis dynamometer 26 and rear wheels 23 that are non-rolling during dynamometer testing. The vehicle 20 may be an automotive vehicle, or may be a truck, tractor, military vehicle, or other type of wheeled vehicle that may be tested on a dynamometer 26.

Figure 2:
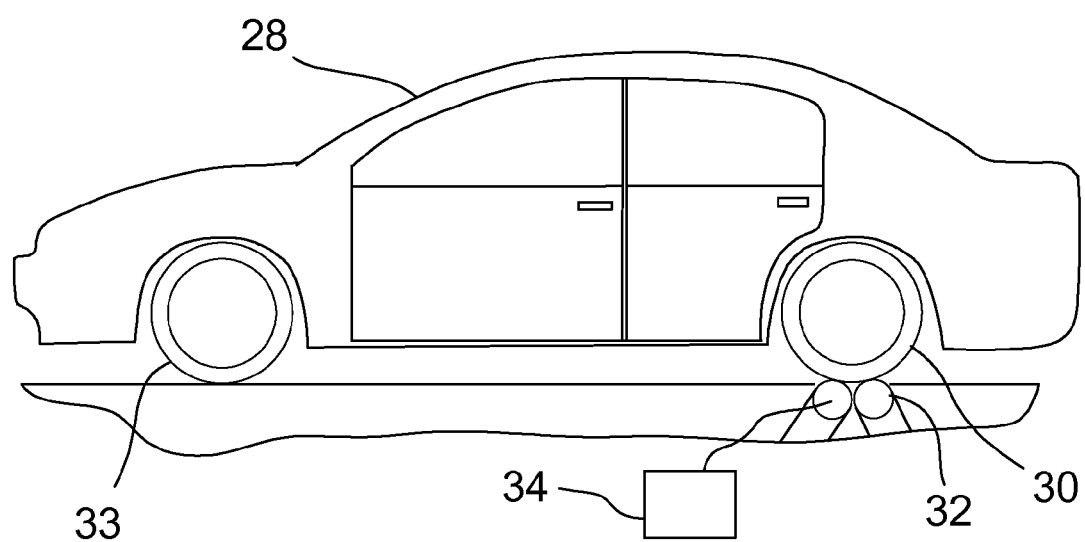
FIG. 2 is a schematic view of a rear wheel drive vehicle mounted in a chassis dynamometer.

FIG. 2 shows a rear wheel drive vehicle 28 with the rear wheels 30 mounted on rollers 32 of a chassis dynamometer 34 and front wheels 33 that are non-rolling wheels during dynamometer testing.

In addition, the dynamometer may be one that has rollers to allow for all wheel (four wheel) drive—that is, a dynamometer having two sets of rollers, one set of rollers 24 for the front wheels and one set of rollers 32 for the rear wheels. This may be similar to a combination of the dynamometers shown in FIGS. 1 and 2. Dynamometers that allow for all wheel (four wheel) drive are known to those skilled in the art and will not be discussed further herein.

Figure 3:
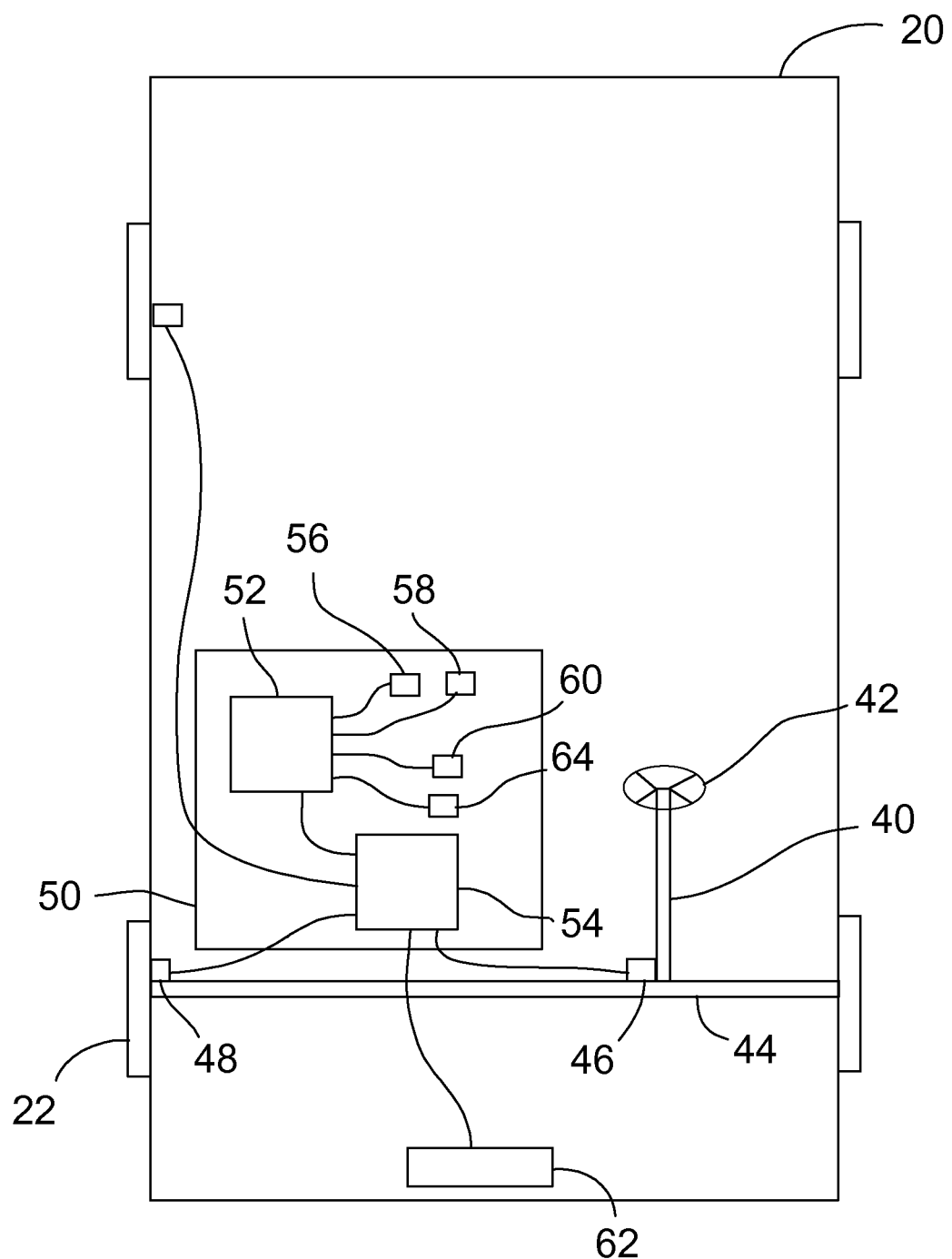
FIG. 3 is a schematic view of a vehicle and systems and sensors that may be employed on the vehicle.

FIG. 3 illustrates the vehicle 20 (or 28) and the systems that may be employed to determine if dynamometer operation algorithms may be executed (dynamometer mode) or if the dynamometer operation algorithms will be exited when conditions are not desirable for such algorithms to operate.

The vehicle 20 includes a steering system 40, which may be hydraulic or electric, having a steering wheel 42 connected to a steering assembly 44 that causes turning of the front wheels 22. The steering system 40 may include a measurement device(s), for example one or more sensor(s) 46, that may be capable of measuring a steering wheel position/angle, an applied force/torque to the steering wheel 42, and/or a power steering pump state (if the system is hydraulic); and/or a measurement device(s), such as one or more sensor(s) 48 that measures applied lateral force on a wheel, and/or a wheel turn (angle) position. These measurement devices 46, 48 may communicate with a control system 50 for the vehicle 20.

The control system 50 may include, for example, an engine controller 52, a body controller 54 and various other controllers on a vehicle, as are known to those skilled in the art. These controllers may be integrated into a single controller assembly, or may be separate, and may be made up of various combinations of electronic hardware and software as is known to those skilled in the art.

The control system 50 may also include an adaptive cruise control system 56, a roll stability and/or yaw control system 58, a global positioning system (GPS) 60, a collision avoidance and/or radar system 62, and/or other systems 64 that may provide vehicle orientation, location, and/or direction indication. One or more of the vehicle systems noted above, which may already be installed on a particular vehicle for use during normal mode of vehicle operation (i.e., typical real world vehicle operation), can be used to provide an indication of a non-dynamometer vehicle operating condition.

Figure 4:
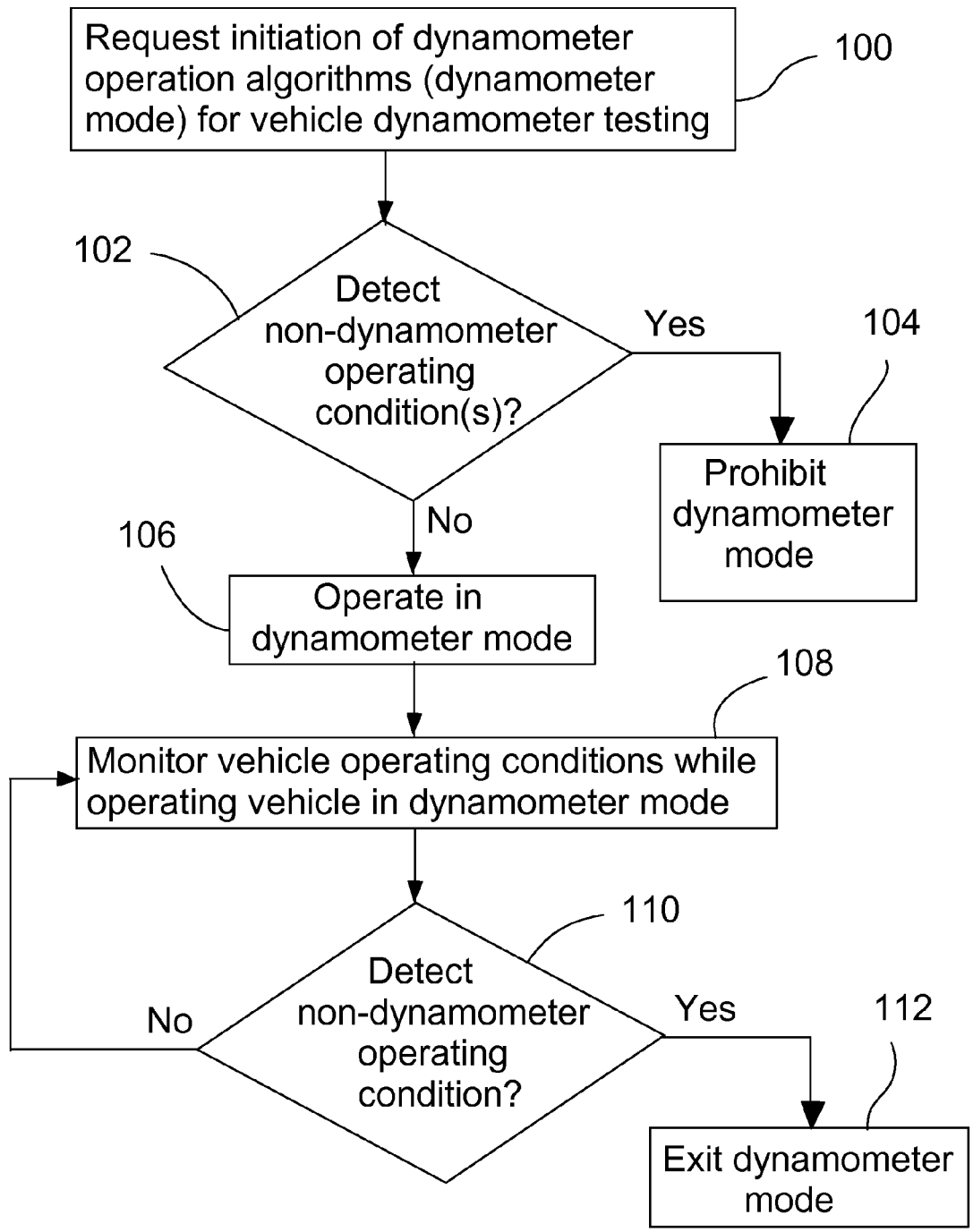
FIG. 4 is a flow chart illustrating a method of operating the vehicle.

FIG. 4 illustrates a method of vehicle operation for automatically switching out of dynamometer mode when a non-dynamometer operating condition is detected. The method can also be used to prevent switching into a dynamometer mode when the non-dynamometer operating conditions are detected.

An initial request for initiation of dynamometer operation algorithms may be made by a technician preparing to conduct dynamometer tests on the vehicle, block 100. A check is made to detect if a non-dynamometer operating condition exists, block 102. Such a check may include, for example, detecting if the steering wheel is being used, such as detecting a steering wheel angle other than straight ahead, applied force on a portion of the steering system indicating a turning condition, lateral force applied to the wheels, a power steering pump state indicating wheel turning, and/or detection that the front wheels are turned. Since the vehicle on a dynamometer is run with the wheels facing straight ahead, any of these indicators may then be interpreted to mean that the vehicle is not mounted in or ready for dynamometer testing—i.e., the vehicle is being operated in a non-dynamometer operating condition. In such a case, the vehicle does not enter the dynamometer operating mode, block 104.

Other indications of non-dynamometer operating conditions may be employed instead of or in addition to the steering indications. For example, an adaptive cruise control system, a roll stability and/or yaw control system, a GPS system, a collision avoidance and/or radar system, and/or other systems that provide vehicle orientation, location and/or direction indication may be used to detect non-dynamometer operating conditions. For example, a vehicle system that can detect movement of the vehicle or a change in orientation of the vehicle allows for detection of the vehicle not being mounted in a dynamometer since the vehicle does not move linearly or change direction/orientation while in the dynamometer.

If a non-dynamometer operating condition is not detected, then the vehicle enters dynamometer mode, block 106. The typical vehicle tests that are run on a dynamometer can now be executed. These tests may be conventional and so will not be described in detail herein. While in this mode, one or more vehicle operating conditions that are indicative of a non-dynamometer operating condition are monitored while operating the vehicle in the dynamometer mode, block 108. If one or more non-dynamometer vehicle operating conditions are detected, block 110, then the dynamometer operating mode is exited, block 112.

Otherwise, the vehicle may continue operating in the dynamometer mode while the vehicle undergoes further dynamometer testing. Once dynamometer mode is activated, it may remain active through multiple vehicle ignition cycles so long as non-dynamometer operating conditions are not detected. This allows completion of a set of driving cycles that makes up, for example, an emission or fuel economy test without having to reactivate dynamometer mode after every time the vehicle is turned off and then restarted.

Figure 5:
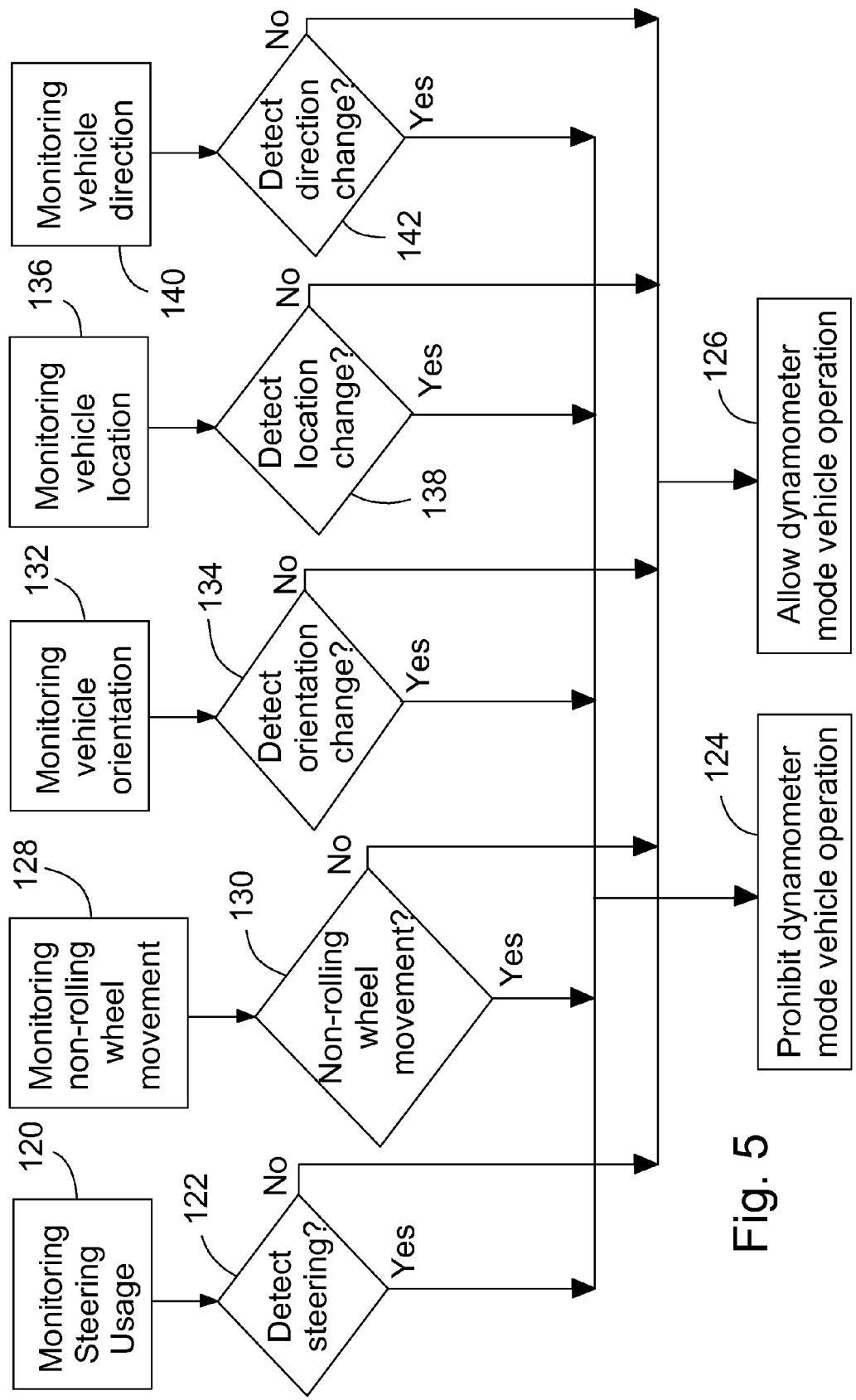
FIG. 5 is a flow chart illustrating monitoring and detecting potential non-dynamometer operating conditions for the vehicle.

FIG. 5 illustrates a flow chart showing examples of one or more vehicle operating conditions that may be monitored to determine if a non-dynamometer operating condition is present. One or more of these processes may be monitored as desired for a particular vehicle. That is, not all vehicles will have all of the various systems described relative to FIG. 5, depending upon the vehicle options. For example, employing a vehicle Global Positioning System (GPS) to detect a change in vehicle location may be desirable for detecting a non-dynamometer operating condition, but if the particular model of vehicle does not include a GPS system, then this type of monitoring cannot be employed for this model of vehicle. But one or more of the other vehicle operating conditions may be used instead for detecting a non-dynamometer operating condition. Not all of the processes relating to vehicle operating conditions shown need to be monitored, as one may select certain vehicle processes that are sufficient to determine when a non-dynamometer operating condition exists.

Steering usage may be monitored, block 120. That is, one may monitor when a vehicle system detects the wheels turning, which is not part of a dynamometer test and so indicates a non-dynamometer operating condition. This steering usage monitoring may take the form of, for example, steering wheel position, applied steering torque, power steering pump state (for a hydraulic steering system), or lateral force applied to the wheels. If steering usage is detected, block 122, then dynamometer mode vehicle operation is prohibited, block 124. If no steering usage is detected, then dynamometer mode vehicle operation is not prohibited, block 126. The detection of steering usage may be set at some predetermined minimal threshold that is close to straight ahead wheel orientation in order to allow for some minimal inadvertent deviation without removing the vehicle from dynamometer mode operation.

Non-rolling wheel movement may be monitored, block 128. This applies to two wheel drive vehicle tests as opposed to four wheel drive dynamometer testing. In a dynamometer test for a two wheel drive vehicle, only the driven wheels are on the rollers, so the non-driven wheels moving (rolling) indicates a non-dynamometer operating condition. This monitoring may take the form of, for example, tire monitors monitoring the non-rolling wheels or tires or sensors associated with an adaptive cruise control or anti-lock brake system. If non-rolling wheel movement is detected, block 130, then dynamometer mode vehicle operation is prohibited, block 124. If no non-rolling wheel movement is detected, then dynamometer mode vehicle operation is not prohibited, block 126. The detection of this wheel movement may be set at some predetermined minimal threshold that is close to no wheel movement in order to allow for some minimal inadvertent deviation without removing the vehicle from dynamometer mode operation.

Vehicle orientation may be monitored, block 132. This monitoring may take the form of, for example, roll stability control or yaw control systems that can detect changes in vehicle orientation. If a change in vehicle orientation is detected, block 134, then dynamometer mode vehicle operation is prohibited, block 124. If change in vehicle orientation is not detected, then dynamometer mode vehicle operation is not prohibited, block 126. Again, some predetermined minimum threshold may be used in order to allow for some minimal inadvertent change in orientation without removing the vehicle from dynamometer mode operation.

Vehicle location may be monitored, block 136. This monitoring may take the form of, for example, a Global Positioning System (GPS) that can detect changes in the location of the vehicle, which is not part of a dynamometer test. If a change in vehicle location is detected, block 138, then dynamometer mode vehicle operation is prohibited, block 124. If a change in vehicle location is not detected, then dynamometer mode vehicle operation is not prohibited, block 126. Again, some predetermined minimum threshold relating to changes in vehicle location may be used to allow for minimal change in location without removing the vehicle from the dynamometer mode operation.

The direction that a vehicle is facing may be monitored, block 140. This monitoring may take the form of, for example, a compass that can detect changes in the direction that the vehicle is facing, which is not part of a dynamometer test. If a change in vehicle direction is detected, block 142, then dynamometer mode vehicle operation is prohibited, block 124. If change in vehicle direction is not detected, then dynamometer mode vehicle operation is not prohibited, block 126. Again, some predetermined minimum threshold relating to changes in vehicle direction may be used to allow for minimal change in direction without removing the vehicle from the dynamometer mode of operation.

If all vehicle operating conditions that are being monitored (steering usage, non-rolling wheel movement, vehicle orientation, vehicle location, and/or vehicle direction) indicate that dynamometer mode vehicle operation is not prohibited, then dynamometer mode vehicle operation is allowed, block 126. But, if any of these vehicle operating conditions that are being monitored indicate non-dynamometer mode vehicle operation, then the dynamometer mode vehicle operation is prohibited. If prohibited, the vehicle may then produce a visual and/or audio signal indicating to the vehicle operator that the vehicle will not operate in dynamometer mode at the present time. Such a signal may include an indication of the reason why the mode cannot be entered.

Other basic vehicle operating conditions may also be used to determine when a vehicle is allowed to switch from normal vehicle operating mode to dynamometer mode. For example, such a switch to dynamometer mode may require that the vehicle transmission is in park or neutral, that the wheel speed for all wheels is close to or at zero, and/or the engine is not currently running.

While certain embodiments of the present invention have been described in detail, those familiar with the art to which this invention relates will recognize various alternative designs and embodiments for practicing the invention as defined by the following claims.

What is claimed is:

1. A method of controlling a dynamometer mode operation of a vehicle comprising:
   (a) requesting the dynamometer mode of operation of an on-board controller;
   (b) after (a), the on-board controller monitoring for at least one non-dynamometer vehicle operating condition;
   (c) when the on-board controller detects at least one of the non-dynamometer vehicle operating conditions, the on-board controller automatically prohibiting dynamometer mode; and
   (d) when none of the non-dynamometer vehicle operating conditions is detected, operating the vehicle in dynamometer mode.

2. The method of claim 1 further including, (e) while operating the vehicle in dynamometer mode, the on-board controller monitoring for at least one of the non-dynamometer vehicle operating conditions.

3. The method of claim 2 further including, (f) if a non-dynamometer vehicle operating condition is detected while operating in the vehicle dynamometer mode, automatically switching out of the dynamometer mode.

4. The method of claim 1 wherein step (b) is further defined by the at least one non-dynamometer vehicle operating condition including a change in steering wheel angle.

5. The method of claim 1 wherein step (b) is further defined by the at least one non-dynamometer vehicle operating condition including an applied torque to a steering system.

6. The method of claim 1 wherein step (b) is further defined by the at least one non-dynamometer vehicle operating condition including an applied lateral force on a wheel.

7. The method of claim 1 wherein step (b) is further defined by the at least one non-dynamometer vehicle operating condition including a movement of a dynamometer non-rolling wheel of the vehicle.

8. The method of claim 1 wherein step (b) is further defined by the at least one non-dynamometer vehicle operating condition including a detection of a change in an orientation of the vehicle.

9. The method of claim 1 wherein step (b) is further defined by the at least one non-dynamometer vehicle operating condition including a detection of a change in a location of the vehicle.

10. The method of claim 1 wherein step (b) is further defined by the at least one non-dynamometer vehicle operating condition including a detection of a change in a direction that the vehicle is facing.

11. The method of claim 1 further including, when initially requesting dynamometer mode, preventing the dynamometer mode operation if a vehicle transmission is not in a position of park or neutral and a wheel speed for all wheels on the vehicle is essentially zero.

12. A vehicle having a dynamometer operation algorithm to operate in a dynamometer mode comprising:
   a sensing system, mounted in the vehicle, configured to detect a non-dynamometer vehicle operating condition;
   an on-board controller configured to monitor the sensing system for the non-dynamometer vehicle operating condition while the vehicle is operating in the dynamometer mode and automatically switching out of the dynamometer mode when at least one of the non-dynamometer vehicle operating conditions is detected.

13. The vehicle of claim 12 wherein the sensing system is a steering system configured to detect a change in a direction of a wheel and the on-board controller is configured to switch out of the dynamometer mode when the wheel changes direction.

14. The vehicle of claim 12 wherein the sensing system is configured to detect a movement of vehicle non-rolling wheel during dynamometer testing and the on-board controller is configured to switch out of the dynamometer mode when the non-rolling wheel moves.

15. The vehicle of claim 12 wherein the sensing system is configured to detect a change in an orientation of the vehicle and the on-board controller is configured to switch out of the dynamometer mode when a change in the orientation of the vehicle is detected.

16. The vehicle of claim 12 wherein the sensing system is configured to detect a change in location of the vehicle and the on-board controller is configured to switch out of the dynamometer mode when a change in the orientation of the vehicle is detected.

17. The vehicle of claim 12 wherein the sensing system is configured to detect a change in a direction the vehicle is facing and the on-board controller is configured to switch out of the dynamometer mode when a change in the direction the vehicle is facing is detected.

18. The vehicle of claim 12 including a second sensing system configured to detect a second non-dynamometer vehicle operating condition, and wherein the on-board controller is configured to monitor the second sensing system for the second non-dynamometer vehicle operating condition while the vehicle is operating in the dynamometer mode and automatically switching out of the dynamometer mode when at least one of the non-dynamometer and the second non-dynamometer operating conditions is detected.

* * * * *